(12) United States Patent
Reuben

(10) Patent No.: US 10,518,488 B2
(45) Date of Patent: Dec. 31, 2019

(54) METHOD OF FORMING A UNITARY DOWN FEATHER ARTICLE HAVING DIFFERENT DENSITY SECTIONS THEREIN

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 0 days.

(21) Appl. No.: 15/732,532

(22) Filed: Nov. 27, 2017

(65) Prior Publication Data

US 2019/0160764 A1 May 30, 2019

(51) Int. Cl.
| | | |
|---|---|---|
| B29C 70/58 | (2006.01) | |
| B29C 70/88 | (2006.01) | |
| B29C 45/00 | (2006.01) | |
| B29C 45/18 | (2006.01) | |
| B29C 45/73 | (2006.01) | |
| D06M 19/00 | (2006.01) | |
| A47G 9/08 | (2006.01) | |
| A41D 31/06 | (2019.01) | |
| D01F 1/00 | (2006.01) | |
| B29D 99/00 | (2010.01) | |
| B29L 31/48 | (2006.01) | |
| B29L 31/52 | (2006.01) | |
| A47G 9/10 | (2006.01) | |

(52) U.S. Cl.
CPC ............ *B29C 70/58* (2013.01); *A41D 31/065* (2019.02); *A47G 9/08* (2013.01); *B29C 45/0001* (2013.01); *B29C 45/0013* (2013.01); *B29C 45/1866* (2013.01); *B29C 45/73* (2013.01); *B29C 70/88* (2013.01); *D01F 1/00* (2013.01); *D06M 19/00* (2013.01); *A47G 9/10* (2013.01); *B29C 2045/0015* (2013.01); *B29D 99/0064* (2013.01); *B29L 2031/4842* (2013.01); *B29L 2031/52* (2013.01)

(58) Field of Classification Search
None
See application file for complete search history.

(56) References Cited

U.S. PATENT DOCUMENTS

| | | | | |
|---|---|---|---|---|
| 5,388,891 A | * | 2/1995 | Oka .......................... | A47C 7/24 297/452.27 |
| 9,039,095 B2 | * | 5/2015 | Janz ......................... | B60N 2/70 297/452.48 |

* cited by examiner

*Primary Examiner* — Monica A Huson
(74) *Attorney, Agent, or Firm* — Guy J. Houle; Houle Patent Agency Inc.

(57) ABSTRACT

A method of forming a single piece, shaped, down feather thermally insulating article having different thermal insulating sections is described. A mold is formed with a cavity defining a non-uniformed prescribed shape and having sections of different shapes and depths. Down feather clusters or a mixture thereof is mixed with a binding material and is injected into the mold which is then heated with a suitable heat source to cause the binding material to soften and fuse the mixture together. After cooling the mold, there is formed a single piece, shaped, down feather article which is comprised of sections having different thermal insulating values for use in a product where parts of the product provide different thermal insulating properties.

14 Claims, 3 Drawing Sheets

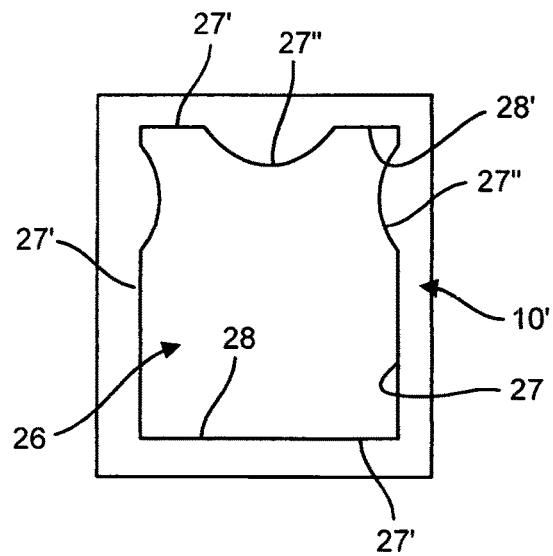
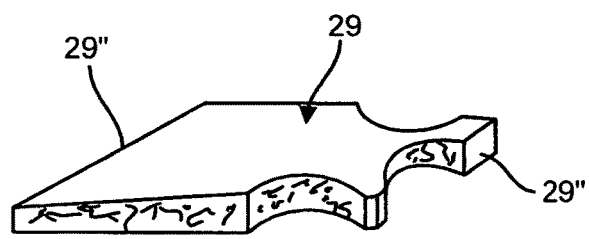
FIG. 4A
FIG. 4B
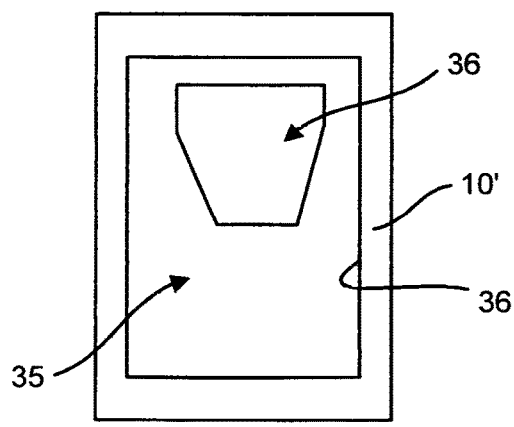
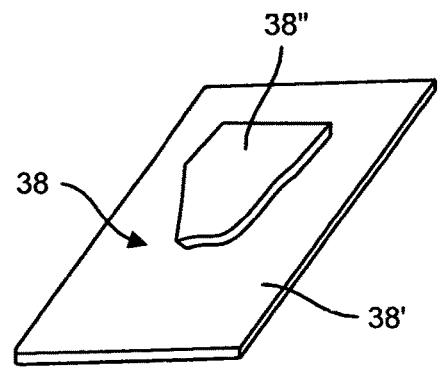
FIG. 5A
FIG. 5B

METHOD OF FORMING A UNITARY DOWN FEATHER ARTICLE HAVING DIFFERENT DENSITY SECTIONS THEREIN

FIELD OF THE INVENTION

The present invention relates to a method of forming a unitary, shaped, down feather article having different density sections to provide different thermal insulation values at specific locations therein and in a product containing the down feather article.

BACKGROUND INFORMATION

It is well known in the art that down is the most efficient natural product that provides maximum warmth with minimal weight. Down is a fluffy material formed of clusters that trap air molecules in small pockets which create a thermal barrier. The clusters have tiny hairs that criss-cross in all directions, up to two million filaments for every ounce of down, and this structure can be compressed to be packed into very small spaces and then released to assume its natural loft. Down insulating material can breathed due to the air captured therein by the clusters. Duck, geese or swan are the only birds that can live in the r and tropics and its down provides heat in the winter time and coolness in the summer time. However, down has some drawbacks when used in free form and this has been addressed in my earlier U.S. Pat. No. 6,025,041 where I describe converting the loose down into sheet form to overcome prior problems associated with the use of down.

Among its many other qualities, down can also provide sound insulation. It is also a product that is bio-degradable. The use of down in manufactured articles also supports the farming communities.

However, down is an expensive material and during its use in manufacturing processes there is a certain percentage of waste, usually in the range of 10% to 20%. This waste material is caused during the stuffing processes or cutting processes when using down in sheet material form, as described in my above referenced patent, and when cutting pattern pieces within the down sheets. This also causes some of the tiny clusters, as described above, to be release in the air causing a health hazard to the working person. Therefore, it is important when working with down to assure that it is always maintained in a captive manner.

When using down material in products as thermal insulation, it is often necessary to provide different thickness of insulation in different part of a product. Using the stuffing method by forming pockets of different size by stitching fabric pieces together and inserting loose down in the pockets is a solution which has many disadvantages which have been addressed in the past. For instance, if the article is an article of apparel, such as a jacket, it provides bulging parts which is not eye pleasing and which provide many disadvantages when the article is washed and ages when the down material forms clumps. The use of down sheet material of my patent overcomes this problem of having to quilt fabric pieces to retain down therebetween. However, the down feather sheets are formed by depositing down cluster mixed with a binder material and heating the mixture to fuse the binder to produce a sheet of substantially constant thickness and constant thermal insulating value.

In the fabrication of thermally insulated articles of apparel, sleeping bags, duvet cover and other articles, it would be advantageous to provide such articles with insulation of different insulating values in a specific part where there is a need for less or more insulation value, such as the bkk portion of a jacket where more insulation is desired in the upper part of the back than in the lower part. Securing down panel sections of different insulation values together is a solution, but it requires more labor and a means of retaining the panel sections together. Also, doubling of panels may provide excessive use of material where it is not necessary and insufficient material where needed resulting in down material waste. Down insulation can have many different uses in commercial applications where thermal insulation is required and often to also provide sound insulation, fireproofing and other features of the insulation. Such additional features are available with my down feather sheet by adding different fibers and chemicals in the down mixture as disclosed in my earlier patents. Accordingly, down insulation may find other commercial applications if it could be produced as a panel with component parts having different insulation values, such as is required in door panels of vehicles or wall panels of aircrafts, as examples only.

SUMMARY OF THE INVENTION

It is a feature of the present invention to provide a method of forming a single shaped, down feather or down mixture article piece, having different density sections to provide different thermal insulation values at specific locations and which substantially overcomes the above mentioned disadvantages of the prior art and which fulfills a desired need.

Another feature of the present invention is to provide a method of forming a single shaped, down feather article piece, having different density sections with substantially no waste of down material which results in savings on labor cost. The molded down product of the present invention is ready for use and provides the proper insulation values where it is needed to isolate cold spots and provide comfort where needed.

A further feature of the present invention is to provide molded thermally insulating articles, such as insulating panels, shaped to a desired form for use in the manufacture of specific products using such articles or panel to provide different insulation values within specific parts of the product.

According to the above features, from a broad aspect, the present invention provides a method of forming a single piece, shaped, down feather or down mixture article having different density sections, said method comprising the steps of:
(i) forming a mold with a cavity defining a non-uniform prescribed shape with different thickness areas;
(ii) filling said mold with a mixture of down feather clusters or a mixture thereof mixed with a heat reacting binder material;
(iii) heating said mold with a heat source to cause said binder material to soften and fuse with said down feather clusters and itself; and
(iv) cooling said mold and removing therefrom said down feather article having said different down or down mixture density sections formed therein.

According to another broad aspect of the present invention there is provided a unitary piece, shaped, down feather article fabricated in accordance with the method described in the preceding paragraph wherein the article is comprised of sections having different thermal insulating value parts for use in a product where parts of the product provides superior thermal insulating properties.

BRIEF DESCRIPTION OF THE DRAWINGS

A preferred embodiment of the present invention will now be described with reference to the accompanying drawings in which:

FIG. 4A is a top view of a cavity formed in a mold part to mold an insulation panel for an article of apparel;

FIG. 4B is a perspective view of the molded panel formed b the mold of FIG. 4A;

FIG. 5A is a top view of a cavity formed in a mold part and wherein the cavity defines a section having a different shape and depth;

FIG. 5B is a perspective view illustrating a down feather article molded with a specific shape and having an internal section thereof formed with a material thickness greater than the surrounding material;

DESCRIPTION OF THE PREFERRED EMBODIMENT

Figure 1:
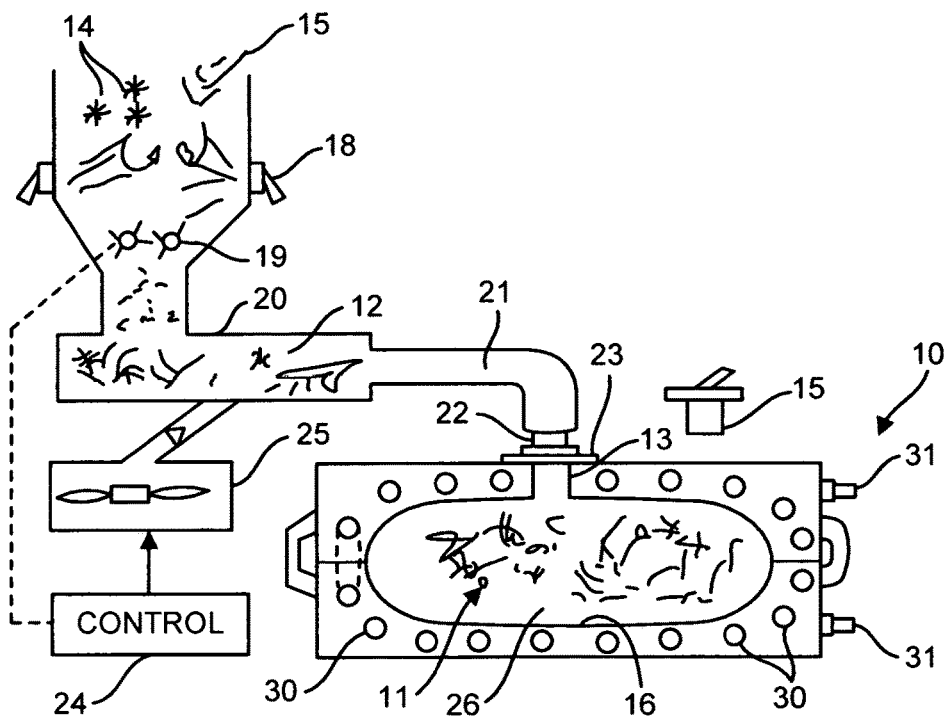
FIG. 1 is a schematic diagram illustrating the molding process of forming a down feather article having different density parts and a specific shape.

Referring now to the drawings and more specifically to FIG. 1, there is shown generally at 10 an example of a mold in which is formed a cavity 11 of irregular shape to define the shape of a single piece down feather article to be formed thereby. As herein illustrated, the shape of the cavity 11 is that of a pillow core wherein the core has different density sections due to its non-uniform shape. The mold has an injection port 13 through which a mixture 12 of down feather clusters 14 mixed with a heat reacting binding material, herein bi-component fibers 15, which are polymeric fibers coated with a binding agent when subjected to heat within a predetermined temperature range, is injected, herein blown into the cavity 11. The binding material can also be in the form of heat settable glue particles, other forms of binding synthetic fibers, such as crimp bonding polymeric fibers, stretchable polymer fibers and combinations thereof. The fibers also provide elasticity to the molded article to permit compressing and stretching of the molded article with the molded mixture recovering its shape after such deformation. Typically, the mixture comprises 65% to 90% of down clusters and 10% to 35% of the binder material. A predetermined quantity of synthetic thermally insulating material in fiber form can also be mixed with the down to reduce cost while maintaining loft. An anti-microbial agent may also be introduced in the mixture depending on the intended use of the article being molded. Still further, depending on the material used to construct the mold, it may be necessary to coat the inner surfaces of the cavity with a non-stick material such as TEFLON, registered trademark, or the like coating material. A plug seals the injection port 13 and projects to the interior surface 16 of the cavity 11 to seal the cavity and provide a uniform molded surface at the area of injection.

As illustrated, the down feather clusters 14 and the binding material 15 are fed to a hopper 17 where air jets 18 and rotating blades 19 cause a mixing action with the mixture discharging at the bottom of the hopper where a substantially uniform mixture is fed to an injection pump supply chamber 20 to which is connected a conduit 21 having a nozzle 22 at an end thereof adapted to be connected to a connector 23 of the injection port 13. A controller 24 operates a blower device 25 to inject into the mold cavity 11 a predetermined quantity of the mixture to form the molded article, herein a pillow core 26.

Figure 2:
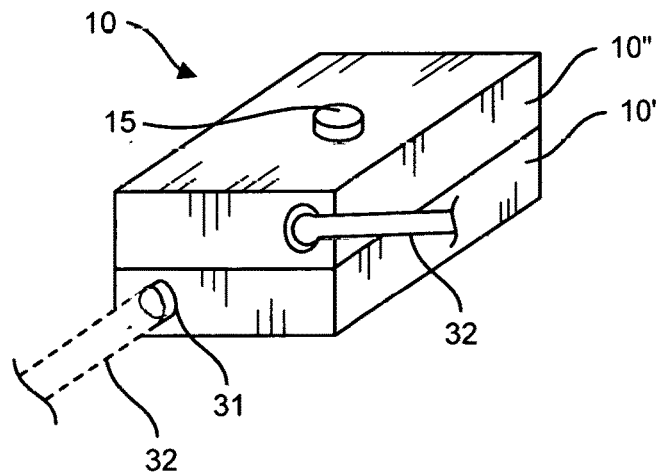
FIG. 2 is a perspective view showing a closed mold in which down feathers and a binder product has been injected and illustrating a cooling process after the mold has been heated to fuse the binder material within the mixture.
Figure 3:
FIG. 3 is a block diagram illustrating the different steps in the process of forming a down feather article having different density parts and a specific shape.

With additional reference to FIGS. 2 and 3, the method comprises different steps after the mold 10 has been filled with the mixture in order to form the molded article, herein the pillow core 26. After filing, the mold is conveyed to a heat treatment wherein the mold is heated to a temperature sufficient to cause the binder, herein the bicomponent fibers 15, to soften and fuse together at their crossings and with the down feathers to fuse with the mixture to form a homogeneous product. The binding agent, dependent on the type thereof, usually fuses within a temperature range of between 160 degrees to 350 degrees Fahrenheit.

After the heat treatment the mold 10 and the product therein needs to be cooled for the removal of the product and the recycling of the mold and this can be effected by various methods. As illustrated in FIGS. 1 and 2, the mold 10 is constructed of metal and is provided with conduits 30 extending in both mold sections 10' and 10" and interconnected together when the mold sections are closed. Connectors 31 are secured to opposed ends of the conduits 30 and to which hoses 32 are connected to circulate a pressurised cooling liquid, herein water, through the mold sections for quick cooling of the mold sections. Thereafter, the molded article, herein the pillow core 26 is removed and the mold is recycled for filing again with the mixture.

FIG. 4A is a top view of the bottom mold section 10' showing a cavity 26 having a pattern shaped contour 27 having straight sections 27' and curved shaped sections 27". Also, the depth of the cavity 27 increases gradually from the bottom edge 28 to the top edge 28' whereby to mold a thermally insulating panel 29 as illustrated in FIG. 4B wherein the thermal insulation value increases from its bottom edge 29' to its top edge 29". Such panel is for example used in the fabrication of the back section of a jacket where more warmth is desired in the upper back part of the jacket.

FIG. 5A is a top view of a bottom mold section 10' in which a cavity 35 is formed and herein delineated by a rectangular contour 36 and having a predetermined depth. A further cavity 36 is formed in the bottom surface 37 of the rectangular cavity 35 and spaced from the rectangular contour 36 of the cavity 35 whereby to form a section of the article, herein a thermally insulating panel 38, as shown in FIG. 5B, with a greater density part, that is to say, with a section which is thicker than the surrounding sections of the article 38. As shown, the molded panel 38 has a large flat section 38' of constant thickness and a shaped, internal sections 38", which is thicker to provide to the panel an area which has more thermal insulation. With prior art methods of fabricating down feather sheets it was not possible to form such a unitary panel having parts or sections thereof of different shapes formed integral with the panel for the reason that those panels were formed by deposition of the mixture on a moving belt conveyor. By forming pre-formed pattern shaped articles, such as the panel 38, in accordance with the method of the present invention, there is also no material waste and no extra labor cost to form such panels, as compared with the prior art, and to integrate them into products where different thermal insulating values are required in different parts of the product to isolate cold spots, such as in portions of articles of apparel, sleeping bags, duvet covers, etc.

Figure 6:
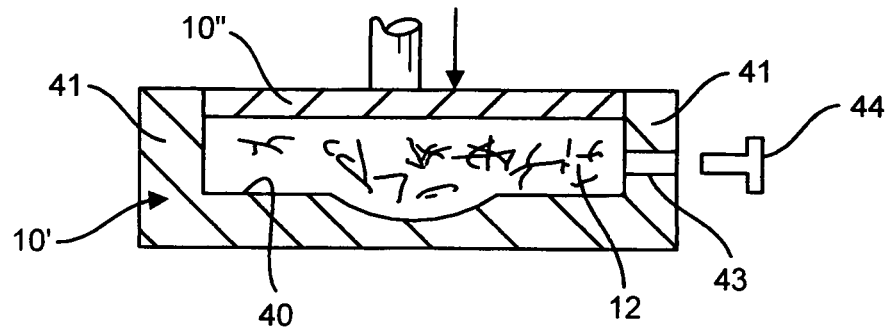
FIG. 6 is a sectional view of a mold wherein one of the mold part is displaceable to compress the down feather and binder mixture injected within the mold cavity.

Referring to FIG. 6, there is illustrated another example of a mold structure wherein the bottom mold section 10' defines a cavity 40 having vertical side walls 41 wherein to receive a top mold section 10" which is displaceable vertically into the cavity 40 by a cylinder rod 42 to compress the mixture 12 injected into the cavity through the injection port 43. A plug 44 seals the port in the manner described above. With such mold construction the density of the thermally insulating article can be controlled to control the stiffness of the molded article depending on its intended use. The cavity 40 is shaped to define a variety of shapes and down densities, such as when used in commercial articles, such as aircraft wall panels, car door panes, etc. . . . . The mold cavity 40 can be machined automatically following instructions from a computer having a model programmed therein, as well known in the art of mold machining.

Figure 7:
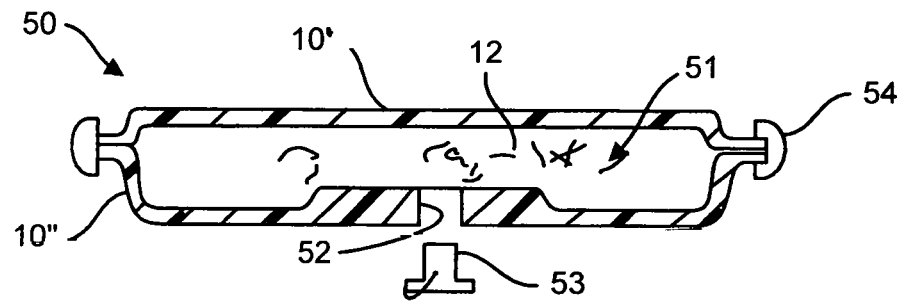
FIG. 7 is a section view of a mold formed of plastic material and wherein one of the parts of the mold is formed of clear plastic material and FIG. 8 is a schematic illustration of a continuous molding conveyor system to carry out the method of the present invention.

FIG. 7 illustrates another example of a mold structure to implement the present invention. As herein shown, the mold 50 is formed of plastic material capable of retaining its shape when subjected to heat at temperatures sufficient to fuse the binding material of the mixture 12. Because the heat source can comprise sources other than radiant heat, such a microwave radiation, induction heating, or other suitable heat sources capable of causing the binder to fuse, using a plastic mold is a less expensive method of molding. Also, the mold section 10" may be formed of clear plastic material whereby to visually inspect the distribution of the mixture 12 injected in the cavity 51 of the mold through the injection port 52 which is sealed off with a plug 53. The mold inner surfaces may also be coated with TEFLON™, registered trademark, or similar coating material to prevent the mixture to stick to the cavity walls during the fusing step. The mold sections 10' and 10" are interconnected together by suitable clamp means 54.

Figure 8:
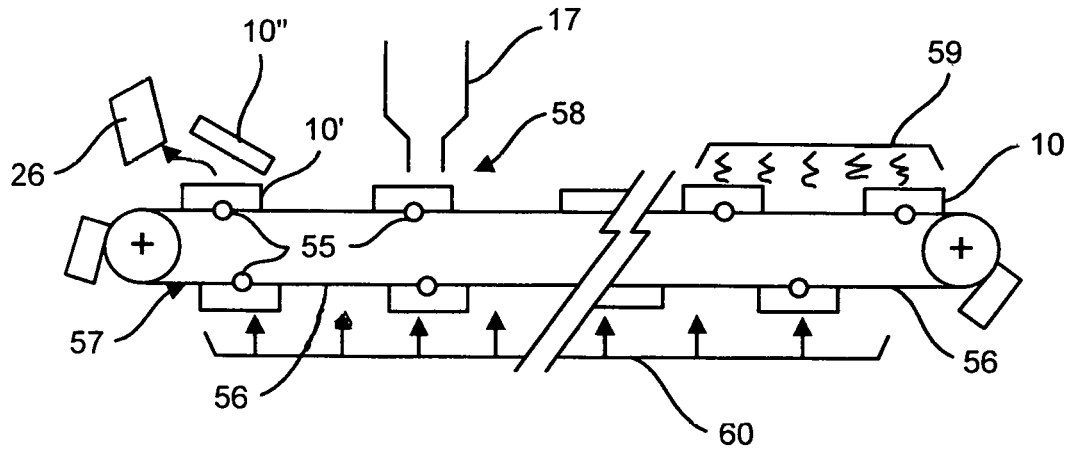

FIG. 8 illustrates a molding assembly to carry out the method of the present invention and many other assemblies are possible and within the scope of the present invention. For example, molds can be secured to a turret arrangement to displace the mold to different stations of the process. As herein illustrated, a plurality of molds 10, of identical construction, are pivotally secure by a pivot connection 55 to an endless belt 56 of a conveyor 57. The mold 10 is filled with the mixture 12 at station 58 and displaced along the conveyor through a radiant heat chamber 59 of sufficient length to heat the mold to fuse the binder. It continues along the conveyor through a cooling chamber 60 to sufficiently cool the mold when it reaches the article extraction station 61 where the mold is opened and the molded article 26 removed. The mold is then displaced to its filing station 58 and the process continues which each mold being recycled.

It is within the ambit of the present invention to cover all obvious modifications of the preferred embodiment and examples of the present invention described herein provided such modifications fall within the scope of the appended claims.

The invention claimed is:
1. A method of forming a single piece, shaped, down feather article having different density sections and to provide different thermal insulating values, said method comprising the steps of:
 (i) forming a mold with a cavity defining a non-uniform prescribed shape with different depth areas;
 (ii) filling said mold with a mixture of down feather clusters or a mixture thereof mixed with a heat reacting binder material by blowing a predetermined quantity of said mixture in said cavity of said mold to totally fill said cavity;
 (iii) heating said mold with a heat source to cause said binder material to soften and fuse with said down feather clusters or a mixture thereof;
 (iv) cooling said mold and removing therefrom a down feather article having said different density sections formed therein.
2. The method as claimed in claim 1 wherein said different depth areas is provided by a gradually changing depth of said cavity extending gradually between opposed ends of said cavity.
3. The method as claimed in claim 1 wherein said step (i) comprises forming said mold with cavity parts, at least one of said cavity parts being of a different depth than other parts of said cavity and spaced at least in part from an outer periphery of said cavity.
4. The method as claimed in claim 1 wherein said step (i) comprises forming said mold from a suitable plastic material capable of retaining its shape when subjected to heat at a temperature sufficient to cause said binder material to soften and bind as defined in step (iii).
5. The method as claimed in claim 4 wherein said step (i) comprises forming said mold with a clear plastic material in at least a part of said mold to provide visibility of said mixture when placed in said mold.
6. The method as claimed in claim 1 wherein in step (iii) comprises heating said mold within a temperature range of between 160 to 350 degrees Fahrenheit.
7. The method as claimed in claim 1 wherein prior to step (ii) of filling, there is provided the step of mixing in an air mixing hopper quantities of said down feather clusters and said binder material and feeding said mixture to an air injecting pump supply chamber, operating an air injecting pump to transfer a predetermined quantity of said down feather clusters mixed with said binder material into said mold through an injection port to transfer said predetermined quantity of said mixture into said cavity of said mold and closing said port.
8. The method as claimed in claim 7 wherein said down feather clusters and said binder material mixture comprises about 65% to 90% of said down feather clusters and 10% to 35% of said binder material.
9. The method as claimed in claim 7 wherein said binder material is comprised of one of bi-component binding synthetic fibers, heat settable glue particles, crimp bonding polymeric fibers and combinations thereof.
10. The method as claimed in claim 7 wherein said step of mixing further comprises the step of adding a predetermined quantity of synthetic thermally insulating material in fiber form with said down feather clusters and said binder material.
11. The method as claimed in claim 5 wherein said step (iii) comprises heating said mold with one of microwave radiation, radiant heat, induction and other suitable heat sources capable of causing said binder material to soften and fuse together and with said down feather clusters to trap said clusters to form a homogeneous molded article.

12. The method as claimed in claim 1 wherein after said step (iv) there is provided the step of re-cycling said mold to a filling station to repeat steps (i) to (iv).

13. The method as claimed in claim 1 wherein after step (ii) there is further provided the step of compressing said mixture in said mold to compress same to a predetermined density.

14. The down feather article as claimed in claim 10 wherein there is further provided the step of adding an anti-bacterial agent with said down feather clusters and said binder material.

* * * * *